(12) United States Patent
Hortin et al.

(10) Patent No.: US 9,482,455 B2
(45) Date of Patent: Nov. 1, 2016

(54) SYSTEMS AND METHODS FOR HARVESTING ICE FROM AN ICEMAKER TRAY

(71) Applicant: ENVOLVE ENGINEERING, LLC, Evansville, IN (US)

(72) Inventors: Gregory Gene Hortin, Henderson, KY (US); Kyle Carter Edmondson, Newburgh, IN (US); Patrick J. Boarman, Evansville, IN (US); Michael Edward Stagg, Evansville, IN (US); Li Yi Situ, Evansville, IN (US)

(73) Assignee: ENVOLVE ENGINEERING, LLC, Evansville, IN (US)

( * ) Notice: Subject to any disclaimer, the term of this patent is extended or adjusted under 35 U.S.C. 154(b) by 0 days.

(21) Appl. No.: 14/683,143

(22) Filed: Apr. 9, 2015

(65) Prior Publication Data
US 2015/0233625 A1 Aug. 20, 2015

Related U.S. Application Data

(63) Continuation of application No. 14/529,140, filed on Oct. 30, 2014.

(60) Provisional application No. 61/977,090, filed on Apr. 9, 2014, provisional application No. 61/897,387, filed on Oct. 30, 2013.

(51) Int. Cl.
| | | |
|---|---|---|
| *H02P 1/00* | (2006.01) | |
| *F25C 1/04* | (2006.01) | |
| *H02P 7/28* | (2016.01) | |
| *H02P 1/22* | (2006.01) | |
| *F25C 1/00* | (2006.01) | |
| *F25C 1/24* | (2006.01) | |

(52) U.S. Cl.
CPC . *F25C 1/04* (2013.01); *F25C 1/00* (2013.01); *F25C 1/243* (2013.01); *H02P 1/22* (2013.01); *H02P 7/05* (2016.02); *H02P 7/28* (2013.01)

(58) Field of Classification Search
CPC ............... F25C 2600/04; F25C 2305/022; H02P 1/022
See application file for complete search history.

(56) References Cited

U.S. PATENT DOCUMENTS

| | | | | |
|---|---|---|---|---|
| 3,580,009 | A * | 5/1971 | Snow | F25C 1/04 62/353 |
| 8,733,113 | B2 * | 5/2014 | An | F25C 5/06 62/340 |
| 2006/0201170 | A1 * | 9/2006 | Cole | F25C 1/04 62/135 |
| 2015/0082816 | A1 * | 3/2015 | Park | F25C 5/16 62/66 |

* cited by examiner

*Primary Examiner* — Karen Masih
(74) *Attorney, Agent, or Firm* — Oliff PLC; R. Brian Drozd

(57) ABSTRACT

A system comprising a gear having at least one slot, wherein the gear is connected to an icetray and a motor so that when the motor rotates the gear, the icetray twists, and an optical sensor that detects when the gear has rotated the slot over the optical sensor. The icetray twists while the gear is rotated in a first direction away from a home position to a reverse twist position. The rotation of gear then reverses to twist the icetray to a harvest position in a second direction that is opposite of the first direction until ice in the icetray is dislodged.

16 Claims, 24 Drawing Sheets

40  42

Motor Rearward Orientation

Motor Frontward Orientation

Delta between temperature (Y-axis) as well as rise time of temperature (x-axis)

SYSTEMS AND METHODS FOR HARVESTING ICE FROM AN ICEMAKER TRAY

CROSS-REFERENCE TO RELATED APPLICATIONS

This application cross-references U.S. Provisional Patent Application 61/897,387 and U.S. Provisional Patent Application No. 61/977,090, which are both hereby incorporated by reference in their entireties.

Also, this application is a non-provisional application of U.S. Provisional Patent Application No. 61/977,090, filed on Apr. 9, 2015, and a continuing application of U.S. patent application Ser. No. 14/529,140 filed on Oct. 30, 2014, the entire disclosure of which is incorporated by reference by its entirety.

BACKGROUND

Control circuits power/control various components of a device, such as an icemaker. However, current designs are not efficient or cost effective and require complex moving mechanical parts. There are also various other disadvantages of current control circuits and components.

SUMMARY

According to one embodiment, a system comprising a gear having at least one slot, wherein the gear is connected to an icetray and a motor so that when the motor rotates the gear, the icetray twists, and an optical sensor that detects when the gear has rotated the slot over the optical sensor. The icetray twists while the gear is rotated in a first direction away from a home position to a reverse twist position. The rotation of gear then reverses to twist the icetray to a harvest position in a second direction that is opposite of the first direction until ice in the icetray is dislodged.

DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Described below are various embodiments of electrical and mechanical controls and components for a device, such as an icemaker. The below embodiments are described relative to implementation using an icemaker for ease of illustration and description, but it should be understood that any of the below embodiments could be implemented in any other system or device. For example, the drive circuit described in FIGS. 1-5 below could be implemented in other devices and should not be limited to an icemaker.

Various embodiments are described below using different headings.

Motor Drive Circuit

Figure 1:
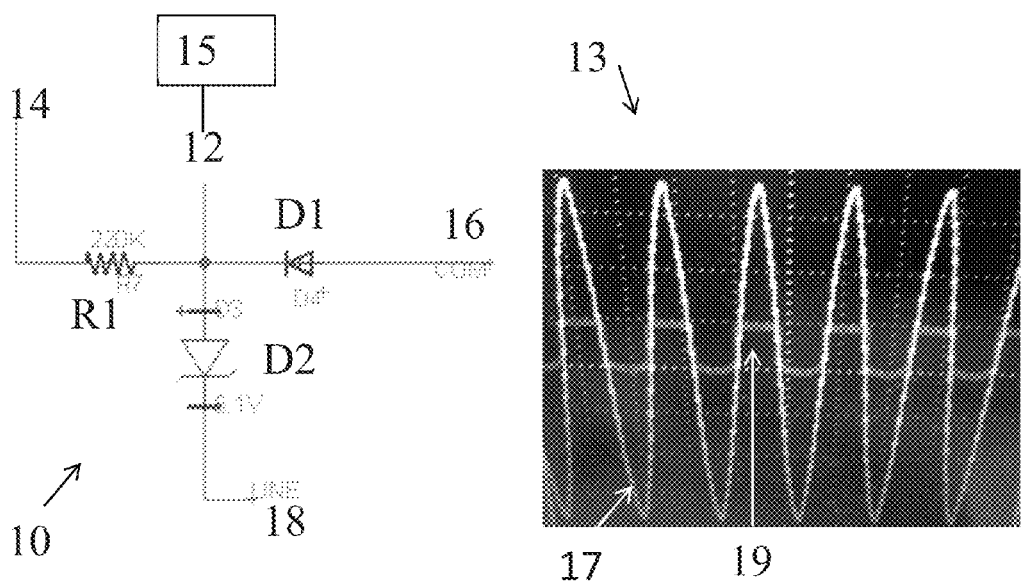
FIG. 1 illustrates a zero cross detection circuit of an icemaker control according to one embodiment.
Figure 2:
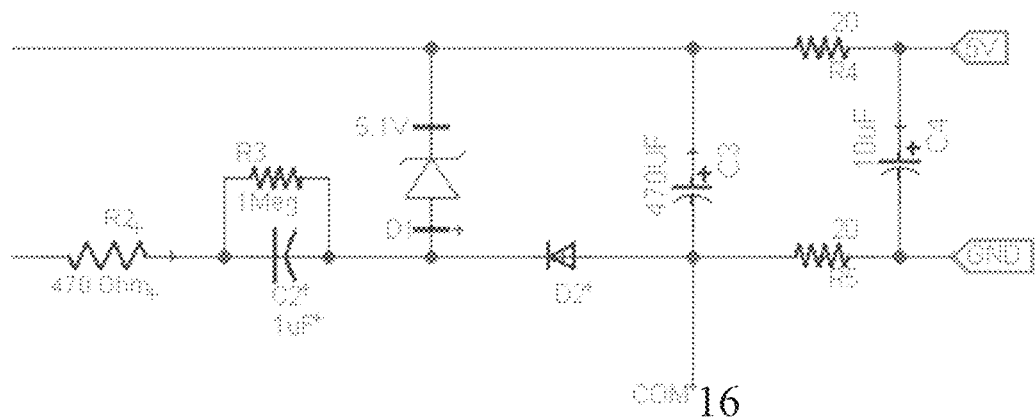
FIG. 2 illustrates a capacitive power supply circuit of an icemaker control according to one embodiment.
Figure 3:
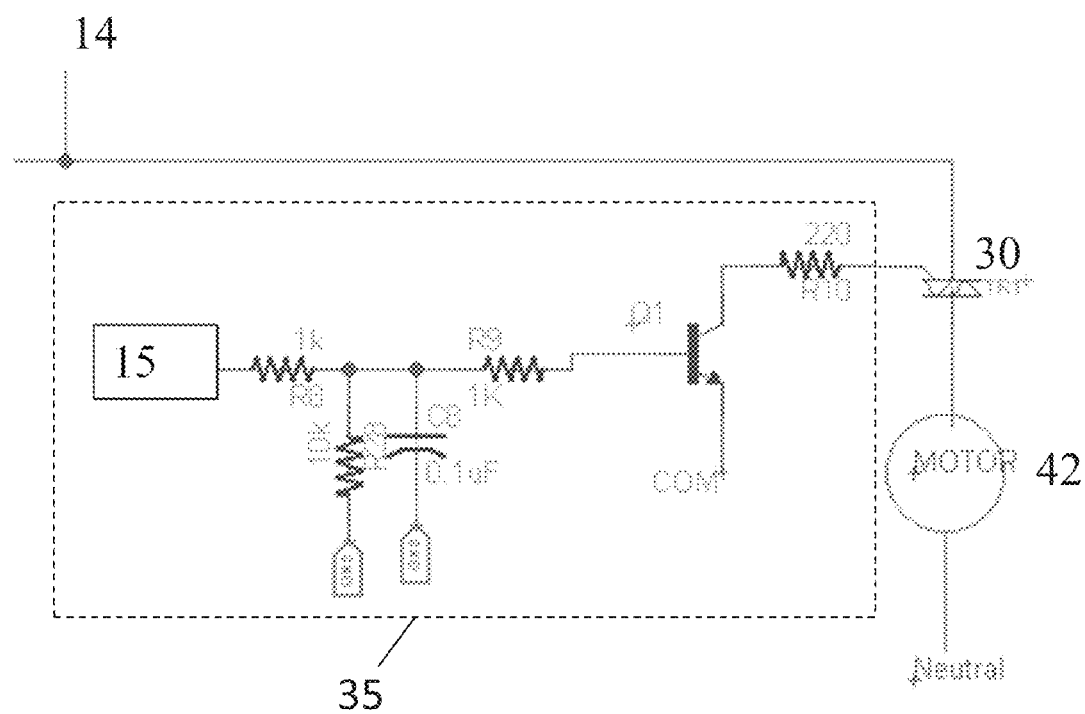
FIG. 3 illustrates a small signal DC motor drive of an icemaker control according to one embodiment.
Figure 23:
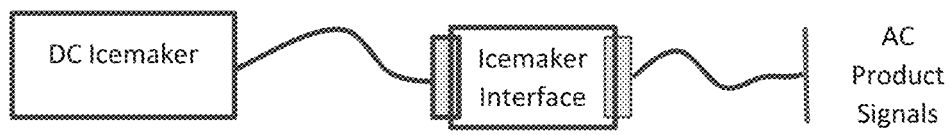
FIG. 23 illustrates a block diagram of a standalone control circuit of an icemaker in accordance with one embodiment.
Figure 24:
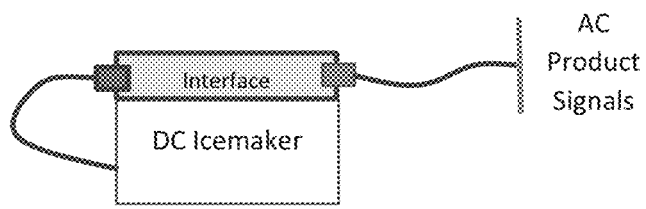
FIG. 24 illustrates a block diagram of a control circuit attached to an exterior of an icemaker in accordance with one embodiment.
Figure 25:
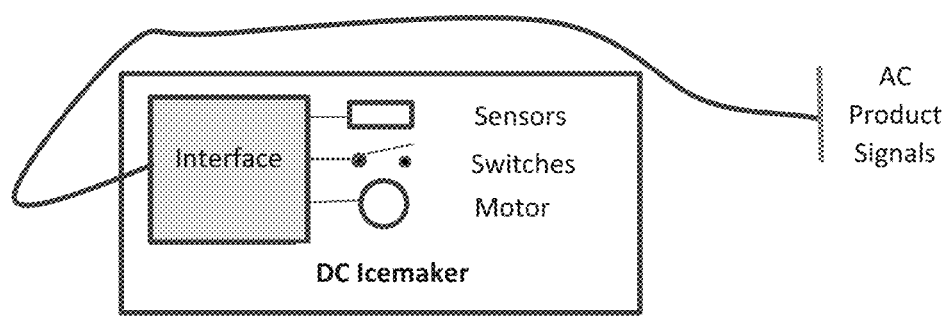
FIG. 25 illustrates a block diagram of a control circuit integrated into an icemaker in accordance with one embodiment.

FIGS. 1-5 illustrate circuits and waveforms for a motor control driving circuit. Generally speaking, a DC motor is directly driven using an AC line directly to an interface or a driver circuit, such as a thyristor or a triode for alternating current ("TRIAC"). This is exemplified the motor control driving circuit may be an icemaker interface, as shown by FIGS. 23-25, that is implemented between an AC signal and a DC icemaker (or DC motor). In another embodiment, the driving circuit of FIG. 3 provides an efficient, low cost method to convert an AC signal to a DC signal for any device, whether an icemaker or other electrical device. A thyristor may be employed to do so.

It is noted that a TRIAC is used below in describing various embodiments, but it should be understood that any thyristor can be employed, including a diode, a triode, etc. The present invention should not be limited to a TRIAC.

As mentioned above, the driving circuit is described below using an icemaker but the driving circuit can be implemented in any other circuit. The icemaker design with the driving circuit of the present application is efficient in terms of both power consumption as well as total cost. The power supply for the control module utilizes a capacitive supply for the small signal electronics and half wave rectification to achieve the DC voltage to achieve maximum efficiency at the required torque. The DC motor can then be driven through solid state devices with small signal electronics. Examples include "H Bridge" transistor configurations or thyristor configurations described herein. The basic power supply design allows the ground signal to follow the AC line signal with a consistent 5V negative offset. This design allows for DC control of a TRIAC to drive AC loads (FIG. 2). The ice is harvested by using a minimal amount of heat (or no heat) to loosen cubes.

Figure 4:
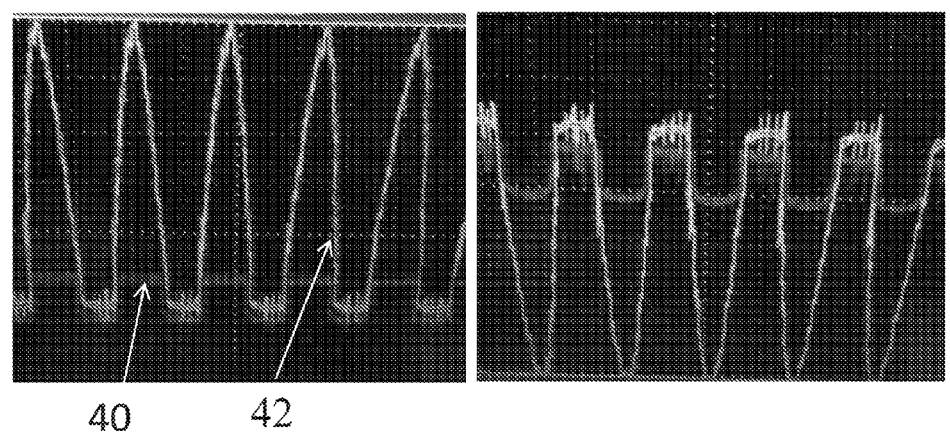
FIG. 4 illustrates graphs of rectified voltage in motor forward and reverse directions of according to one embodiment.

In order to improve reliability of the circuit, the half wave rectifier and the "H bridge" can be eliminated and replaced with a zero cross detection circuit (FIG. 1) and a thyristor device (consider the case of a TRIAC). When the zero cross detection circuit transitions from low to high, the TRIAC is pulsed (turning it on). Since the TRIAC will turn itself off with the next zero crossing, we can continue to pulse the TRIAC at each low to high transition of the zero cross circuit. This has the effect of creating a positive half wave rectified signal that will rotate the motor in the forward direction (FIG. 4). Likewise, when the zero cross signal transitions from high to low the TRIAC can be pulsed which will result in a negative half wave rectified signal which will rotate the motor in the reverse direction (FIG. 4). In addition to reducing components as compared to a half wave rectifier with an H-bridge, the thyristor circuit will perform equally as well when the line and neutral wires are reversed (a common occurrence in many households). When using a rectifier with an H-bridge, swapping the neutral and line AC wires will likely result in one or more of the transistors having the maximum base voltage exceeded resulting in overstress and eventual failure of the circuit. The thyristor (or TRIAC) does not share this limitation as the device was designed and always intended for current flow in either direction. Additionally, the same thyristor output may control a DC motor or AC loads.

Some other embodiments demonstrate the use of a thyristor to control the speed and direction of a DC motor. There are at least two differences in the approach described in FIG. 3 and the design that use a thyristor to control the speed and direction of the DC motor. Such latter designs use an AC control signal to activate the thyristor and a full wave rectifier bridge to provide DC voltage. In the DC motor controller described in FIG. 3, a small signal zero cross detection circuit (shown in FIG. 1) is implemented which creates a DC pulse train with the logical "high" levels corresponding to the positive cycles of the AC signal and the logical "zero" levels corresponding to the negative AC cycles (FIG. 1). The zero cross detection is implemented as to not introduce any phase shift into the detection so the motor can be switched efficiently with minimal power consumption.

In order to understand some embodiments, one may first need to understand the small signal power supply that is utilized in the circuit. The capacitive power supply (FIG. 2) is implemented as a low cost way to regulate the AC voltage to electronic level voltages (in this case 5.1V). The capacitive supply is extremely efficient as the only current used is that which is required by the circuit. The basic power supply design essentially allows the ground signal to follow the AC line signal with a consistent 5V negative offset. In the switching circuit for the thyristor, the small signal electronics and the thyristor share the same voltage references. This allows the small signal electronics circuit (FIG. 3) to directly switch the thyristor on without the need for any coupling devices commonly seen when interfacing DC and AC signals.

The second improvement is the elimination of the diode bridge. By switching the thyristor on at appropriate times (by monitoring the zero crossing with the small signal circuit) a half wave rectified voltage is created without the use of rectifiers (FIG. 4). Switching in the positive cycle, creates a positive DC voltage moving the motor forward while switching in the negative cycles creates a negative DC voltage moving the motor in reverse. Likewise, we can control the phase angle of the switching to regulate the voltage further or to adjust the speed of the motor. By utilizing the optical encoding of the output gear, the torque of the motor can be increased during the high stress points of the harvest and reduced during the low stress points of the harvest cycle. The benefit is increased motor life.

Figure 5:
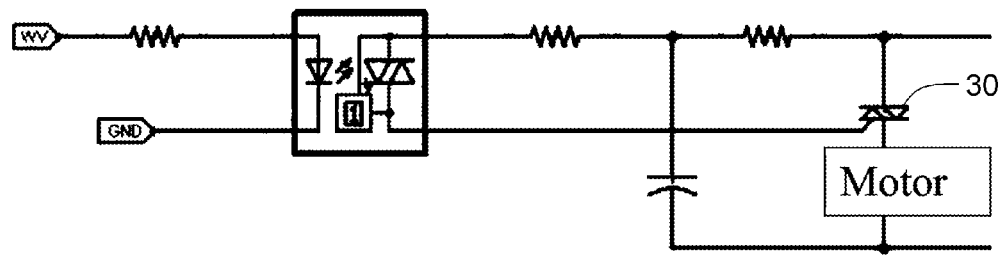
FIG. 5 illustrates an electrically-isolated DC motor controller of an icemaker control according to one embodiment.

This circuit can be integrated directly into the icemaker or can be implemented as a non-integrated motor controller providing complete electrical isolation by using an optical TRIAC as the switching device, as shown in FIG. 5.

A more detailed description of each figure is provided below:

FIG. 1 illustrates a zero cross detection circuit 10 of an icemaker control according to one embodiment. This circuit 10 allows one to know where the AC wave is in the sinusoidal cycle. Line 12 is connected with a microprocessor 15 and sends an output signal (19) from the circuit 10 to microprocessor, line 14 is a neutral line, line 18 is an input line that receives an AC signal input (shown as element 17), and line 16 is a common or ground line. When the AC waveform 17 goes negative, the output signal 19 of the circuit 10 outputs a first voltage (e.g., zero volts). On the other hand, when the AC waveform 17 goes positive, the output signal 19 of the circuit 10 outputs a high constant voltage, such as 1 or 5 volts. This is shown in the graph 13 in FIG. 1.

FIG. 2 illustrates a capacitive power supply circuit of an icemaker control according to one embodiment. FIG. 2 illustrates a conversion of a 120 V waveform to a 5 V DC waveform without isolating the signals. FIGS. 1-2 share the same common point 16.

FIG. 3 illustrates a small signal DC motor drive of an icemaker control according to one embodiment. The TRIAC 30 is pulsed from the microprocessor to turn the TRIAC 30 on. The components shown in box 35 are of a small signal DC pulsing circuit (or a thyristor control circuit) used to pulse the TRIAC 30. It should be noted that the microprocessor receives the input from circuit 10 and outputs a pulse signal to turn TRIAC 30 on. When the TRIAC is pulsed or turned on (by the microprocessor), the TRIAC stays on until the input AC signal reaches zero. This is shown in the lefthand graph of FIG. 4 where the input of the TRIAC is an AC signal 17 and the output of the TRIAC is shown at 42 (the output signal 42 goes to motor 44). The zero-cross signal is shown at 40 in FIG. 4 which is the pulse signal to turn the TRIAC on and off.

Also shown in FIG. 4, the TRIAC turns off when the AC signal goes to zero or above (unless the microprocessor keeps the TRIAC on). When the TRIAC turns itself back off (e.g., when the AC signal goes to zero or above), the TRIAC will not turn on again until a pulse (e.g., a high signal from signal 40) is provided by the microprocessor via the pulse circuit.

The TRIAC is functioning as a half-way rectifier in FIG. 3. TRIACs are more robust components because it withstands higher current surges that occur when a motor is initially switched on. The TRIAC allows for the elimination of a bridge rectifier plus an H-bridge and all of the control circuitry which would be required. As such, a TRIAC is a much more efficient use as a half-wave rectifier.

FIG. 4 illustrates graphs of rectified voltage in motor forward and reverse directions of according to one embodiment. FIG. 4 shows a half-wave generation by rectifying the negative portion of the input AC line. The graph on the left in FIG. 4, the TRIAC is being pulsed when the AC signal is going negative, and in this regard, the TRIAC is pulsed by the microprocessor on a periodic basis. Thus, in FIG. 4, the TRIAC is being pulsed at the same frequency as the input AC signal. This creates a half-wave rectifier.

FIG. 5 illustrates an electrically-isolated DC motor controller of an icemaker control according to one embodiment. FIG. 5 shows the TRIAC in series with the motor and the circuit is electrically isolated (for safety reasons). FIG. 5 is an alternate to the circuit of FIG. 3.

Figure 21:
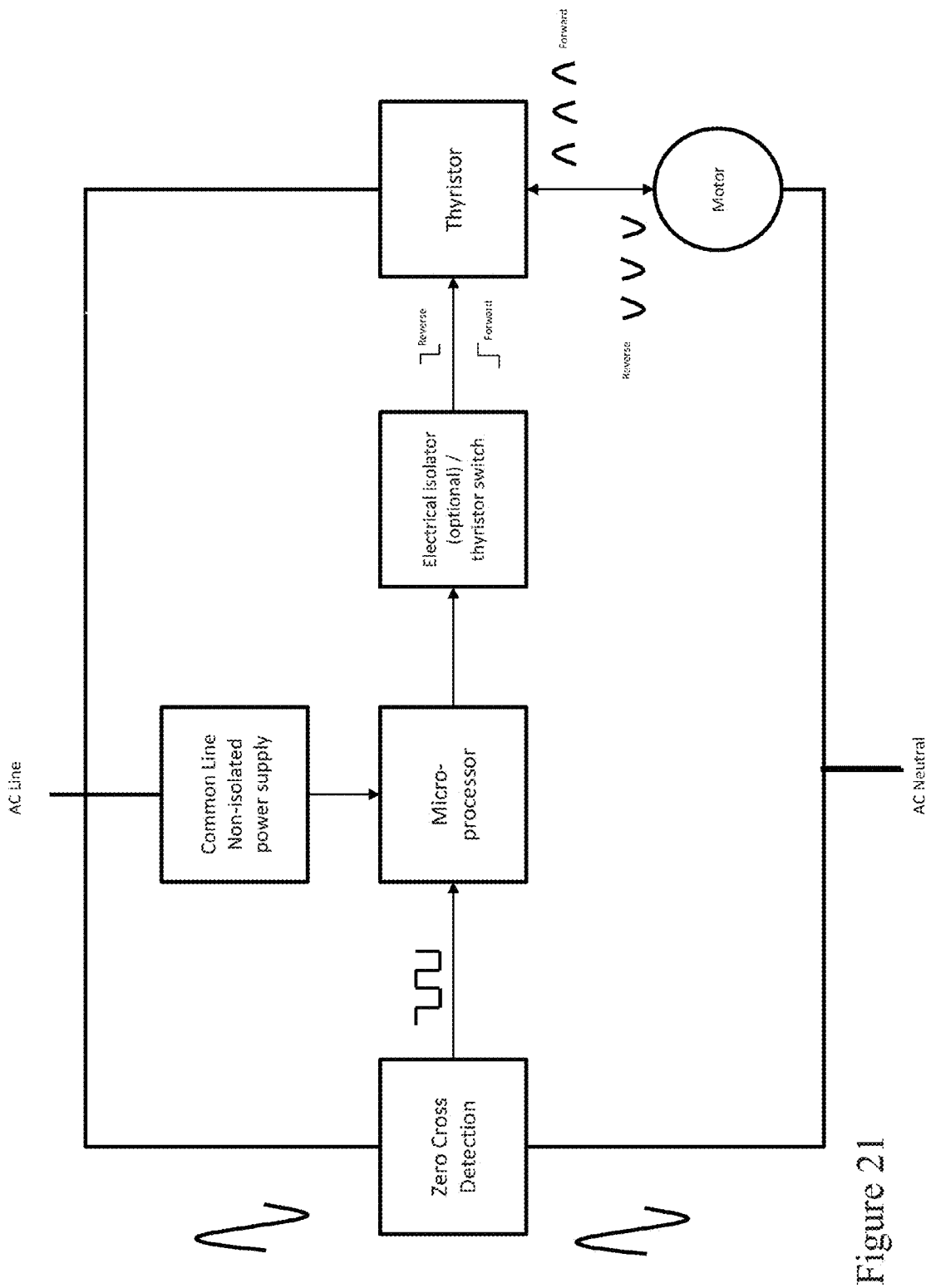
FIG. 21 is block diagram of a system for an icemaker control circuit in accordance with an embodiment.

FIG. 21 illustrates a block diagram of a system of the present application. As shown the zero-cross circuit (such as the circuit 10 of FIG. 1) may be connected to a microprocessor (such as processor 15 of FIGS. 1-2). The AC signal is applied to both the zero-cross detection circuit and the thyristor. The zero-cross detection circuit outputs the square wave (such as the signal 19 of FIG. 1) to the microprocessor. The microprocessor may output a signal to control the thyristor either directly or through the electrical isolator/thyristor switch. The thyristor outputs a DC signal to the motor in response to the AC signal input and the micro-processor pulse signal.

Figure 6:
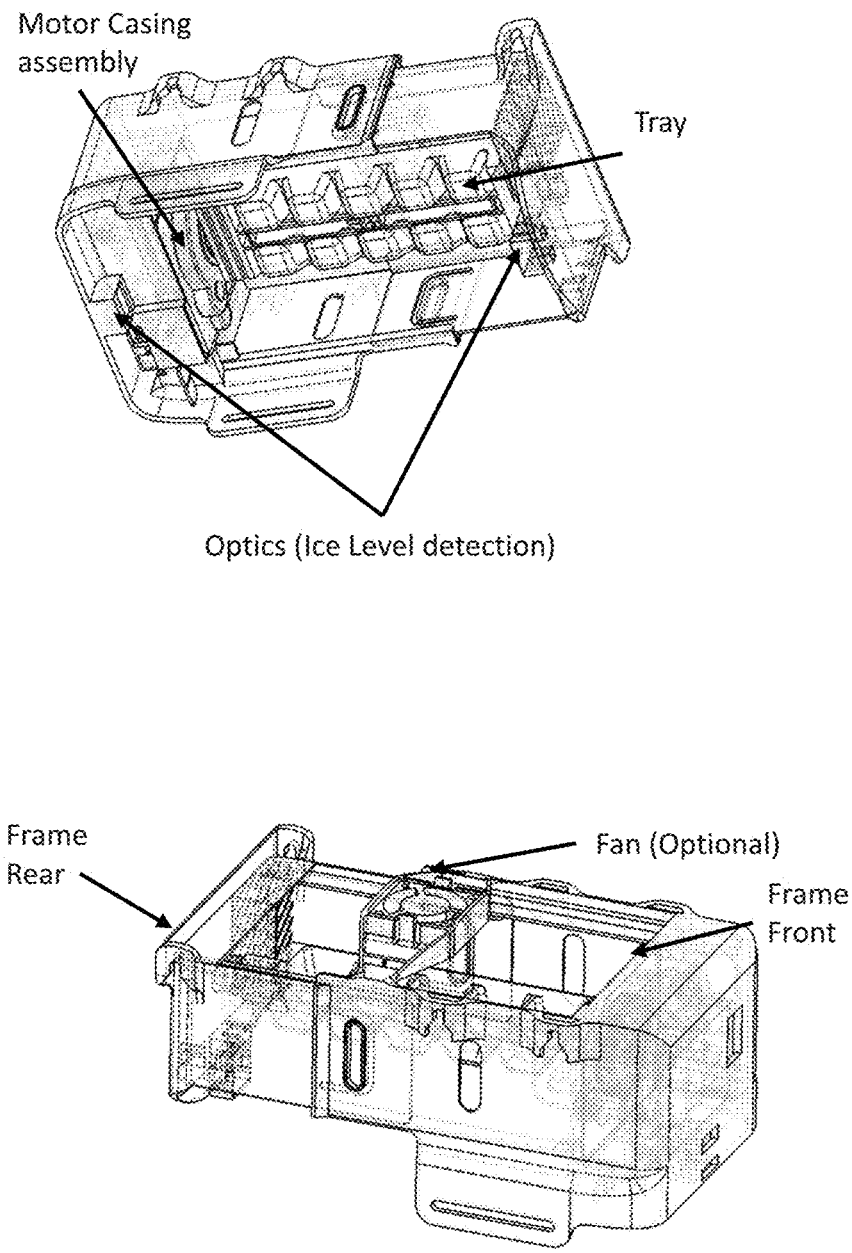
FIG. 6 illustrates an AC twist tray icemaker according to one embodiment.

FIGS. 6-20 show various components of an icemaker, such as a motor, a motor casing assembly, an icetray, optics for ice level detection, an optional fan, gears and/or other components of an icemaker. FIG. 6 shows an icemaker that is interchangeable, mechanically and electrically, with standard AC crescent cube icemakers with the following characteristics:

Input Signals (AC): Line, Neutral, Water Valve, Ground

Keyhole mounting of the frame to the liner walls

This icemaker improves over previous AC icemaker designs as follows:

1. Low energy usage: The icemaker does not rely on heat to remove the cubes from the tray.

2. Reliability: This AC icemaker is completely solid state with no moving parts (expect the motor, gears and tray). The solid state design is safe to use where sparks or arcing (inherent in other icemaker designs) creates an unsafe operating condition.

Figure 7A:
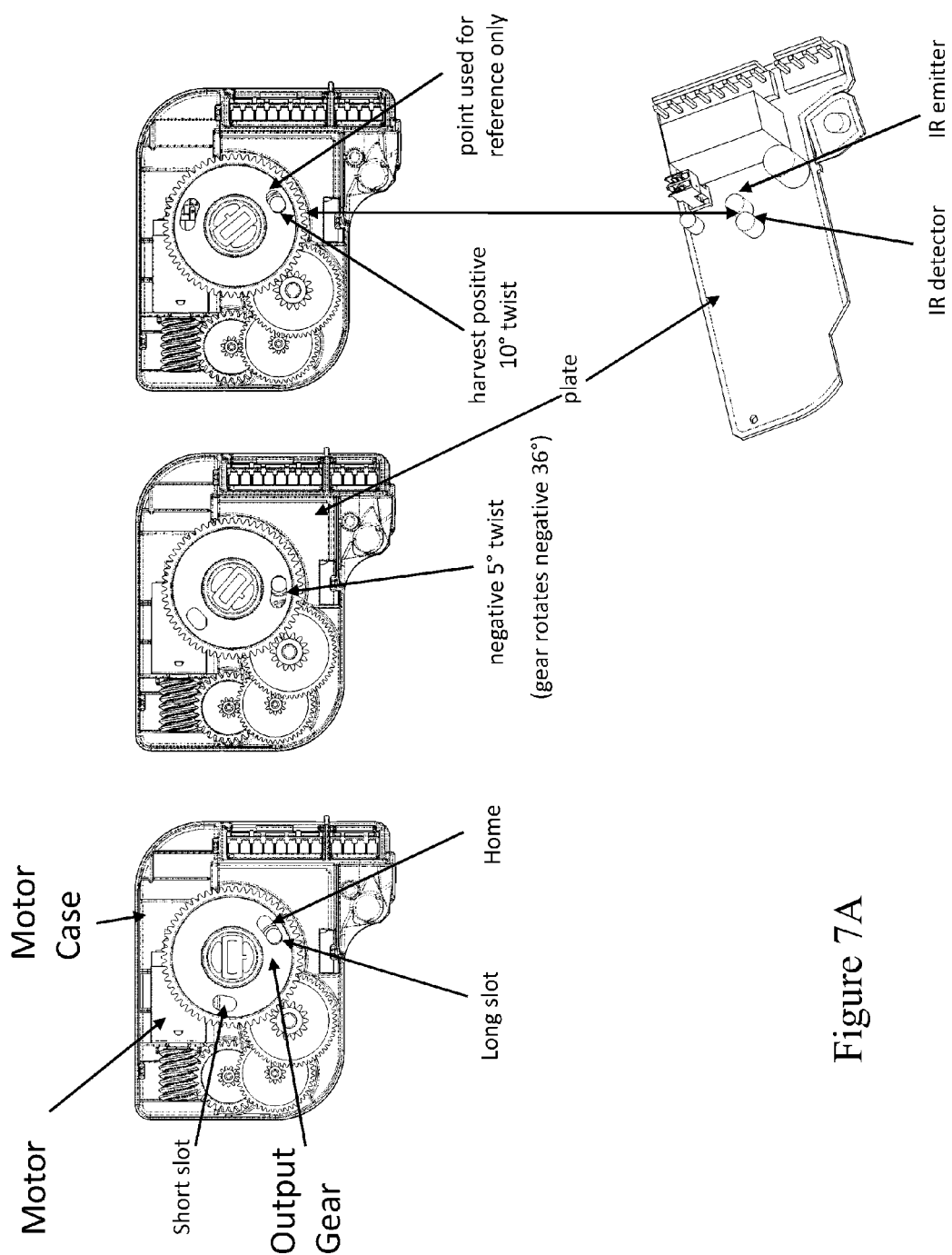
FIG. 7A illustrates a harvest control optics of the twist tray icemaker of FIG. 6, according to an embodiment.

3. Adaptability: A telescoping design allows the user to select the size of the ice cubes (and ice tray) to customize the size (and space usage) to accommodate their usage patterns FIG. 7A illustrates harvest control optics. A solid state standalone icemaker that is self-contained with no moving parts (except for the motor and gears) is provided and may include a motor, an output gear, a motor case, an IR emitter, and an IR detector. A gear train is connected with the icetray and is optically encoded providing a feedback loop to the control module to determine the rotation angle of the icetray during critical operational points. The IR emitter and IR detector work in combination to detect when the IR is at the location of the long slot or short slot and when the IR is not exposed by either of the slots. If the IR detector receives IR light, then the system knows that the IR detector is at one of the slots; otherwise, the system knows that the IR detector is not at one of the slots.

Figure 7B:
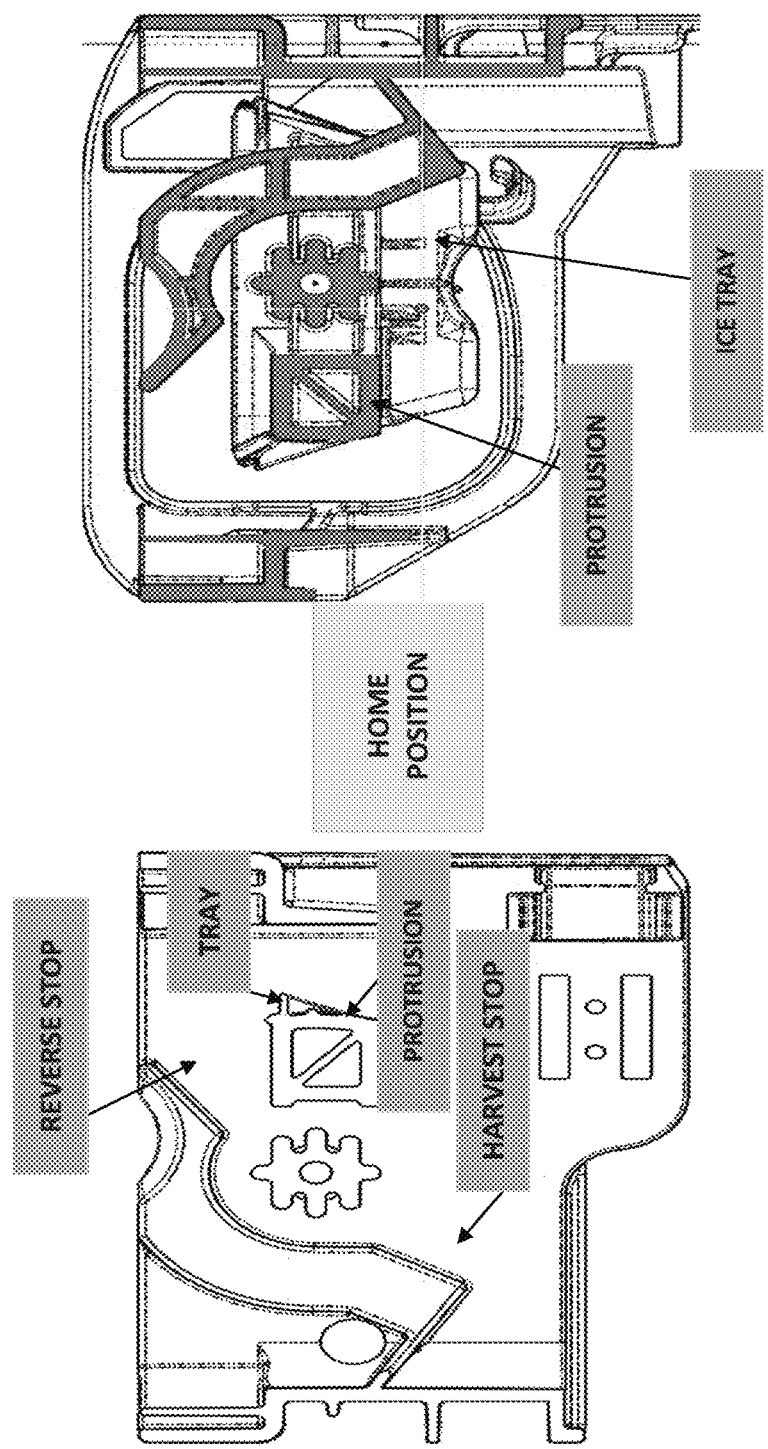
FIGS. 7B-7D illustrates operation of harvesting ice in combination with a harvest control optics of the twist tray icemaker of FIG. 6, according to an embodiment.
Figure 7C:
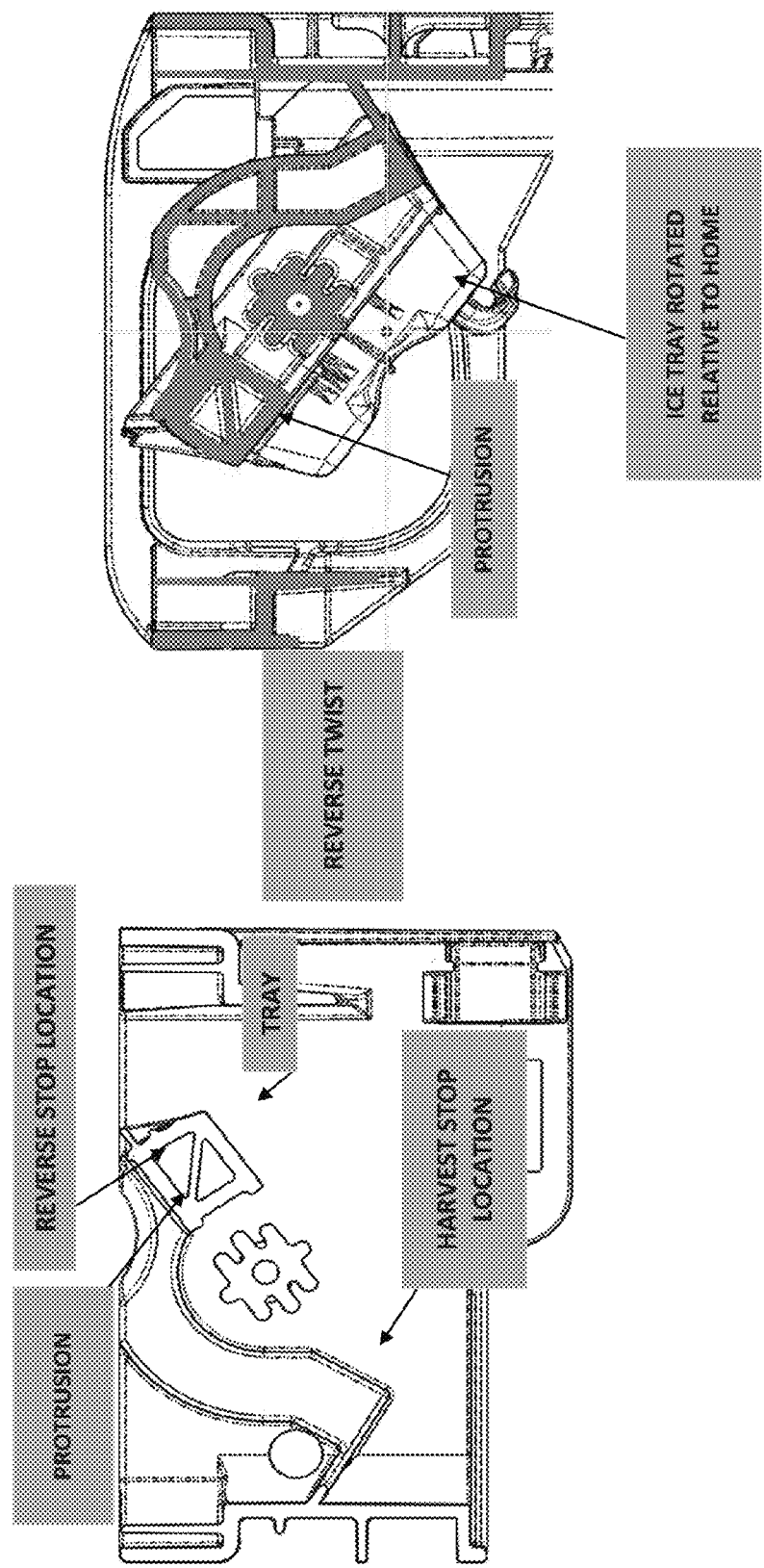
Figure 7D:
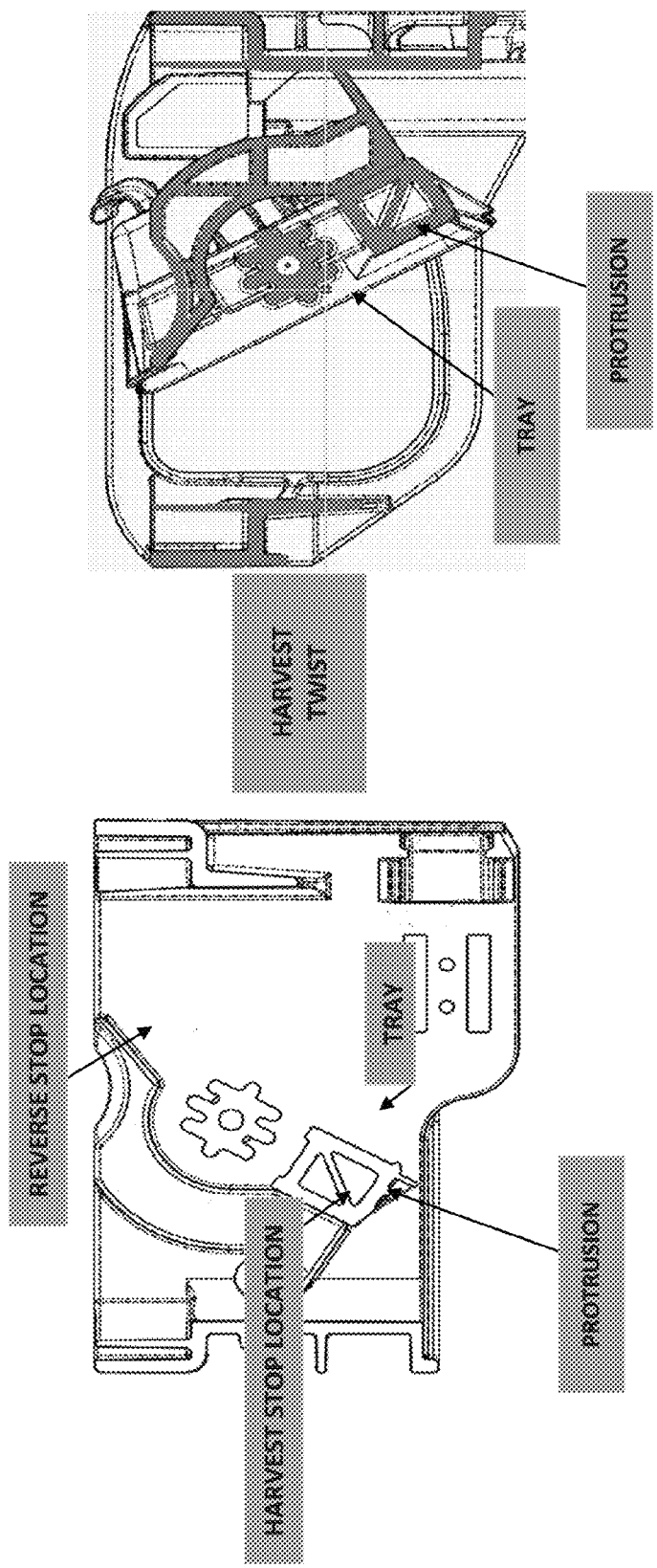

In order to work properly, the position of the ice tray should be known. There are at least two positions that should be known in order to function properly. The two positions may be distinguished by differing slot lengths (with the long slot or the short slot). The "Home" position is where the tray is initially situated horizontally and is filled with water and remains in this position until the water is fully frozen and is ready for harvest. This is shown in FIG. 7B. The home position is determined based on the IR detector optical lens being situated to receive light through the slot, as shown in FIG. 7A.

The second position is a "Harvest" position (shown in FIG. 7D) where the tray has been rotated to the degree where one a protrusion on end of the tray has hit the harvest stop (e.g., a "lip") on the icemaker frame while the other end continues to be slightly twisted, allowing the cubes to fall out. This position is determined by the optics based on IR light (emitted by the IR emitter) no longer being received by the IR detector (optical lens) through the short slot (shown in the far right hand figure of FIG. 7A). At that point, the system knows to stop twisting and to twist in the opposite direction so as to return to the home positing.

In addition to these two positions, this design adds a third position of "Harvest Initiation" (shown in FIG. 7C and also corresponding to the middle figure of FIG. 7A) which happens at the beginning of the harvest rotation (in other words after the "Home" position but before "Harvest"). Force is applied to at least a first end of the ice tray so that the tray is rotated opposite the harvest direction until a protrusion at a second end of the tray hits a stop and thereafter the first end of the tray is then briefly further twisted to rotate the first end of the tray relative to the second end of the tray. This reverse twisting motion helps to loosen the cubes and allows the tray to be twisted to a lesser degree when the final harvest motion occurs (which is in the harvest direction), thus reducing overall stress on the tray and lengthening tray life.

Thus, for harvesting ice, the tray is first twisted in a first direction, and then is twisted back to the Home position. Then the tray is twisted in the harvesting direction for a first predetermined time period. Last, the tray is twisted further in the harvesting direction for a second time period to release all of the ice out of the tray.

Figure 8:
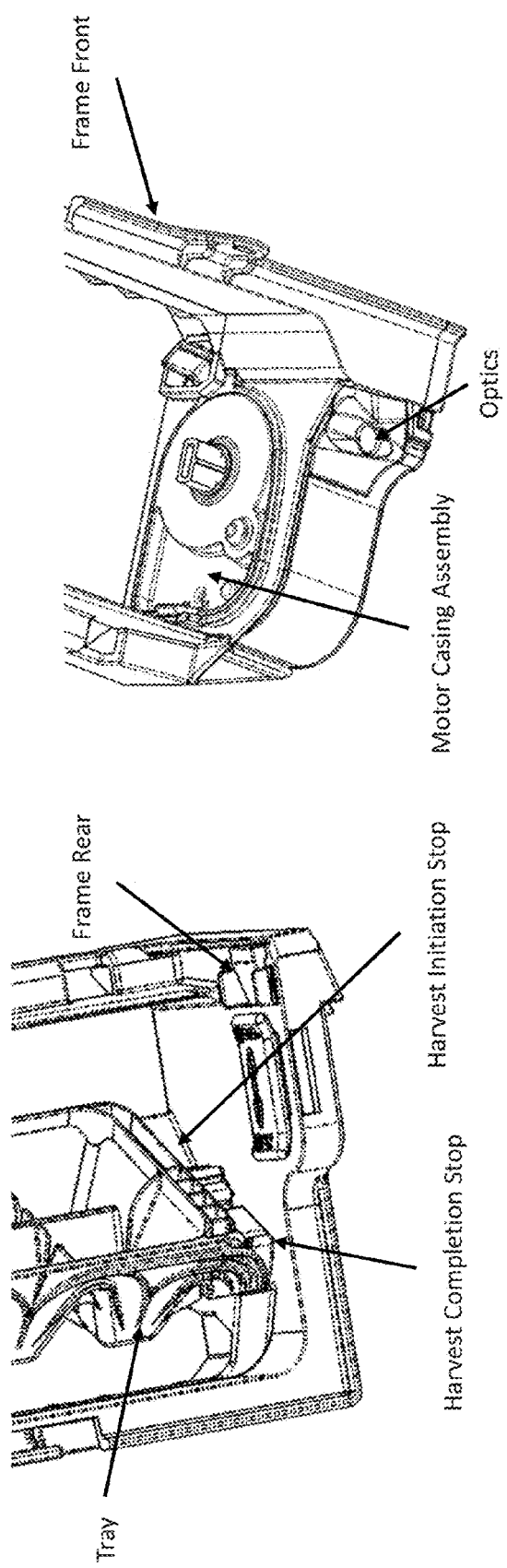
FIG. 8 illustrates frame feature details of the twist tray icemaker of FIG. 6, according to an embodiment.

FIG. 8 illustrates frame feature details of the twist tray icemaker of FIG. 6, according to an embodiment. Such configuration improves the reliability of the ice tray by employing a reverse twist and/or adaptive twisting algorithm that reduces the stress points that occur over the life of the product. The reverse twist algorithm helps to loosen the cubes and prevent "memory" in the ice tray during the harvest twist sequence. In the early stages of life, the twist angle can be minimized. By adapting the twist angle in proportion to the age of the tray, part reliability can be maximized.

The main reason for having a large degree of twisting during the harvest cycle is to accommodate the extraction of cubes when the tray has accumulated calcium and other mineral deposits later in the tray's life. When the tray is new, only a small degree of twist is required to extract the cubes. A progressive degree of twisting as the tray ages, will improve the overall life of the tray by reducing fatigue.

Figure 9:
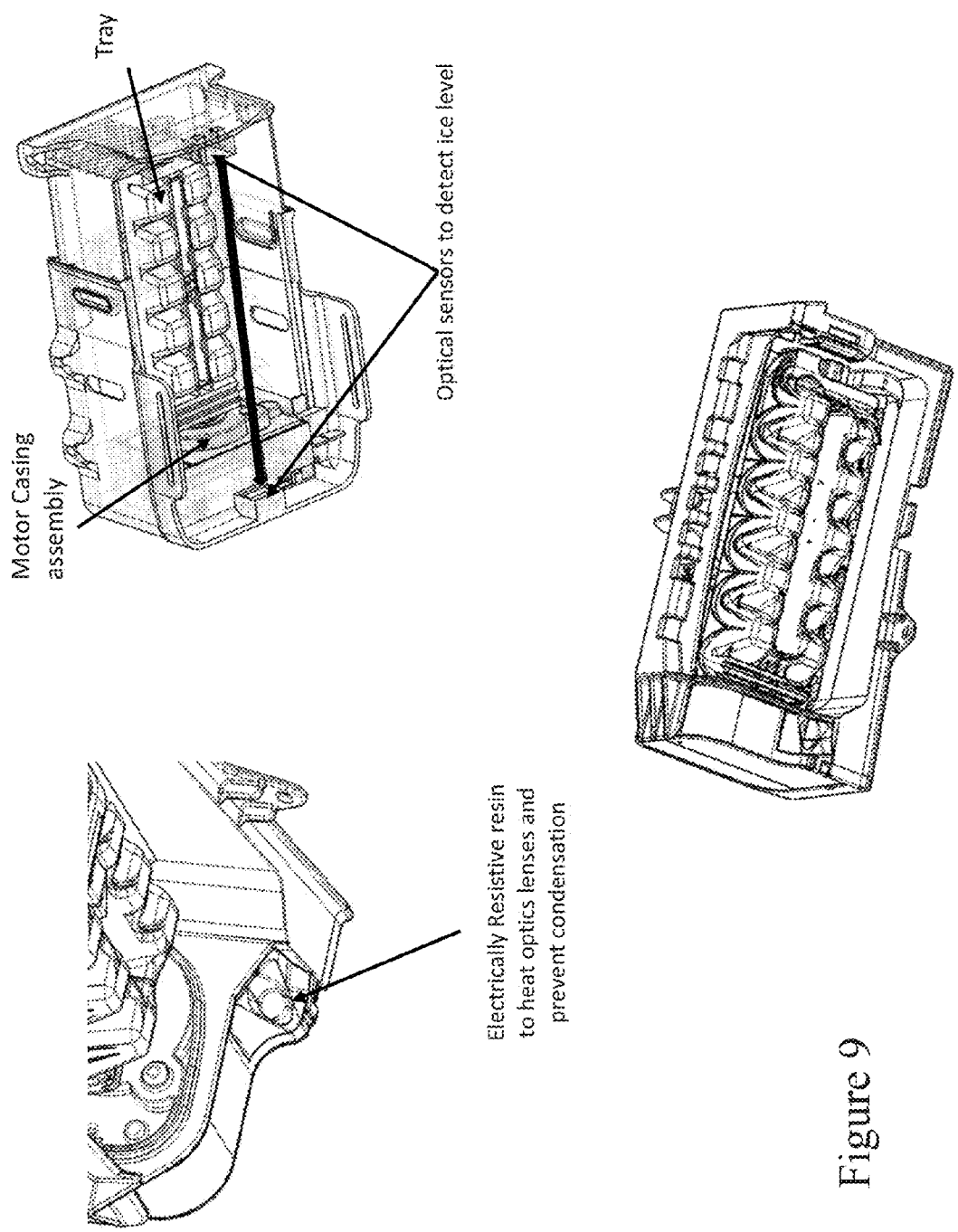
FIG. 9 illustrates optical ice level sensing of the twist tray icemaker of FIG. 6, according to an embodiment.

FIG. 9 illustrates optical ice level sensing of the twist tray icemaker of FIG. 6, according to an embodiment. Thermally conductive resins can be used for the lenses to prevent or eliminate any frosting that will affect the optics ability to detect the presence of material in the ice bin. This can be used in place of or can assist traditional defrosting systems (resistive heat).

Provided may be optics that are collocated utilizing a reflective surface on the icemaker to detect any material in the ice bin. The emitter and detector of the optics may be located on opposing sides of the tray and reflect off of an opposite surface. The optics (emitter and detector) determine if any material (e.g., water or ice) is in the tray and if so to report such results back to the system. The light received by the emitter will change based on whether material is in the tray relative to if the material is not in the tray.

Figure 10:
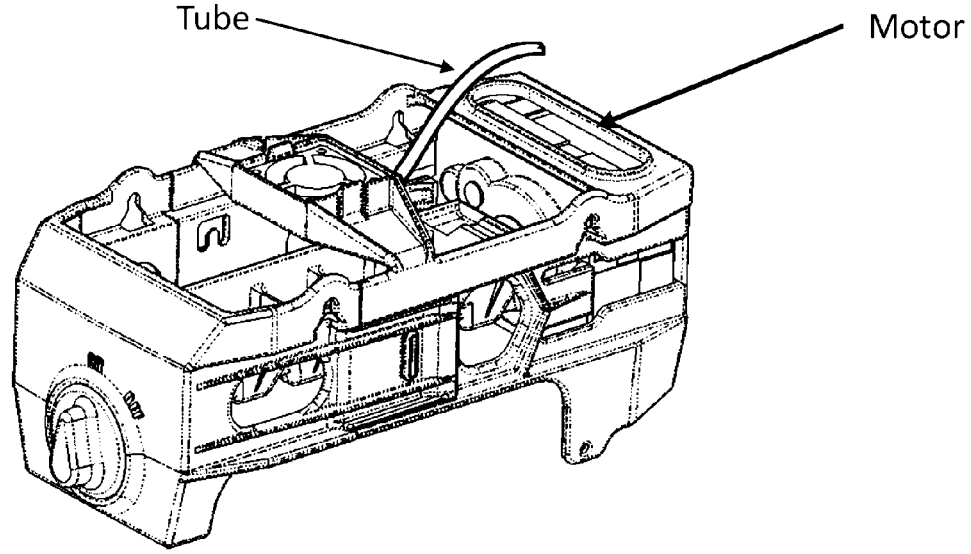
FIG. 10 illustrates variable mounting orientations of the twist tray icemaker of FIG. 6, according to an embodiment.
Figure 10:
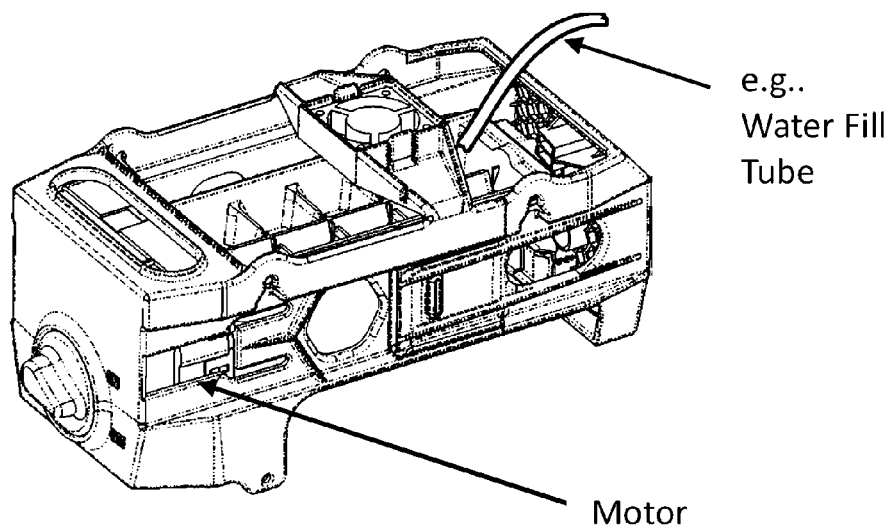

FIG. 10 illustrates variable mounting orientations of the twist tray icemaker of FIG. 6, according to an embodiment. Due to the wide variety of refrigerators that have been produced over the past 40+ years with icemaker connections, it is desirable to have a flexible mounting arrangement. The frame design allows for the motor to be positioned toward the front or the rear of the product. This is particularly valuable when considering the variation that exists in water fill tube and electrical connections.

Figure 11:
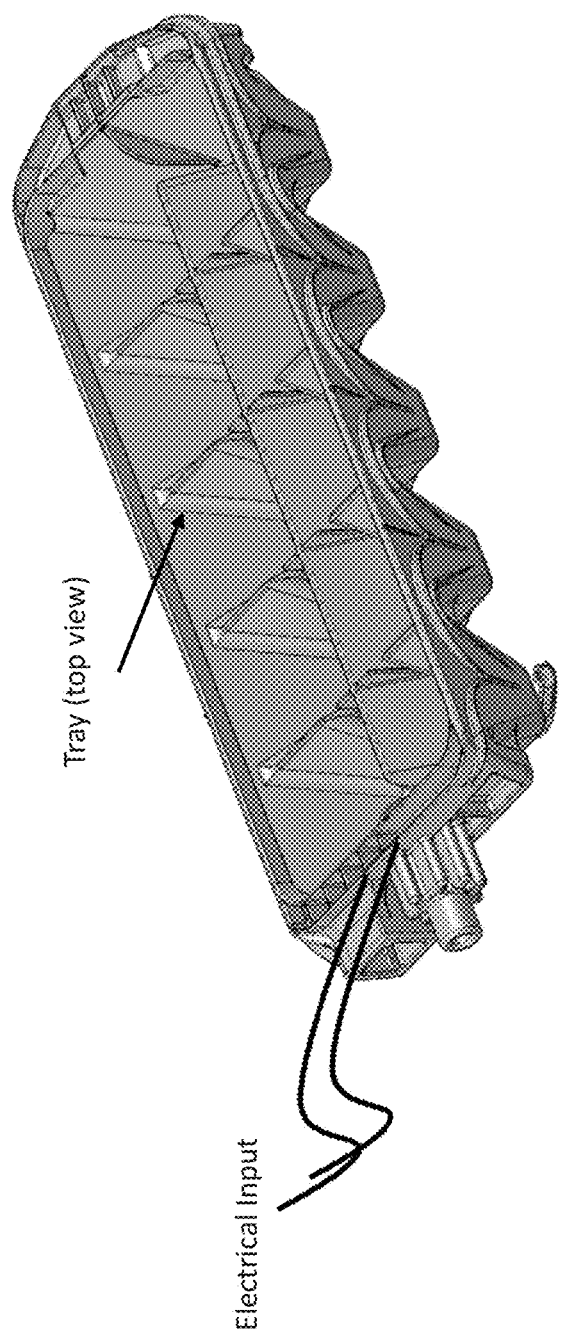
FIG. 11 illustrates a resistive tray of the twist tray icemaker of FIG. 6, according to an embodiment.

FIG. 11 illustrates a resistive tray of the twist tray icemaker of FIG. 6, according to an embodiment. The tray in FIG. 11 may be made of a metal or other thermally-conductive material. The thermally-conductive molded ice tray can improve the reliability of the ice making process by applying a small amount of heat directly to the surface of the cubes. Such heat provides a small layer of water between the tray and the ice to "lubricate" the ice cubes when removing them from the tray. In this regard, the heat allows the tray to be twisted to a much lesser degree to extract the ice cubes, thus improving the life of the tray by drastically reducing the fatigue. Heating of the tray can be used to produce clear ice by ensuring directional freezing of the ice cubes from top to bottom.

Figure 12:
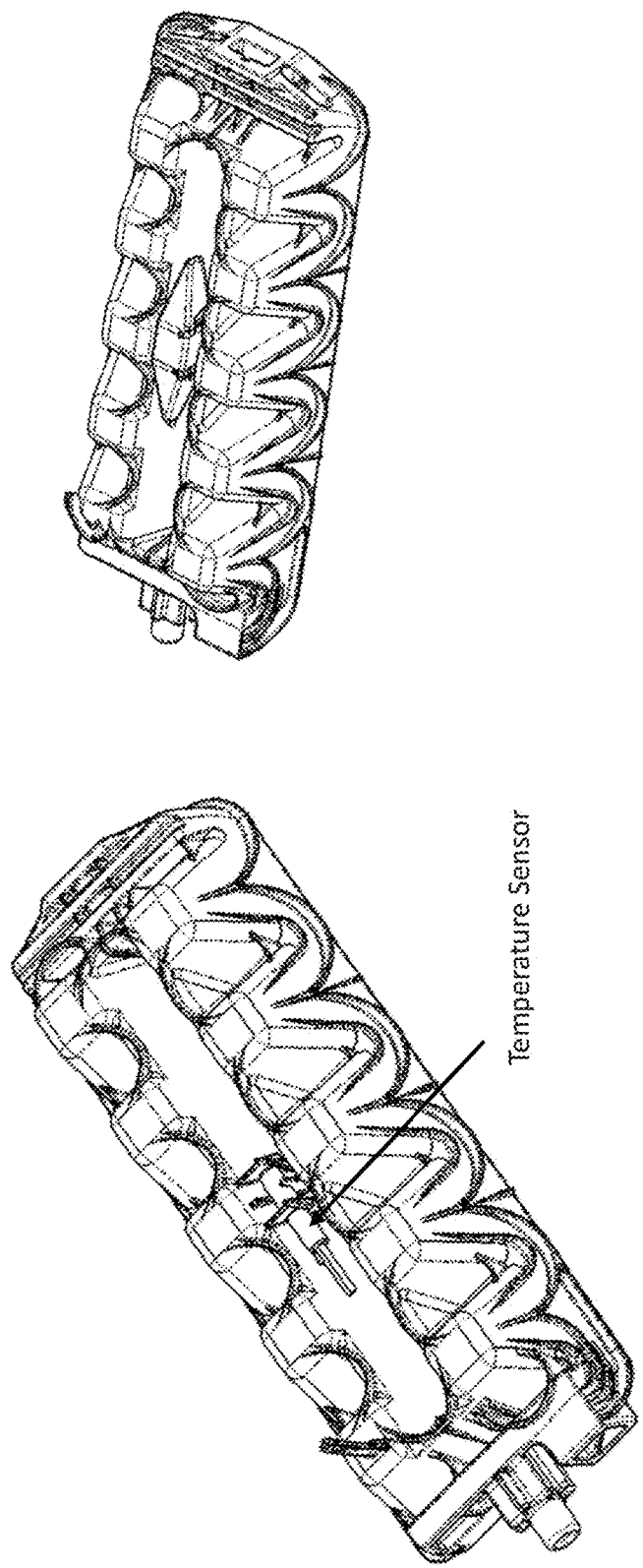
FIG. 12 illustrates an adaptive filling algorithm of the twist tray icemaker of FIG. 6, according to an embodiment.

FIG. 12 illustrates an adaptive filling algorithm of the twist tray icemaker of FIG. 6, according to an embodiment. Provided is an adaptive filling algorithm for the ice tray using a temperature sensor on the ice tray. The temperature sensor provides feedback of the temperature of the ice cubes indirectly by measuring the temperature of the tray. By utilizing temperature feedback from the ice tray, it is possible to confirm the presence of water at a certain level after a fill request. The temperature of water at an initial fill condition to a first water level is known to be a first predetermined temperature, at a second water level is known to be a second predetermined temperature, etc. If the desired response is not detected, additional water can be requested until the proper temperature response is detected. Temperature feedback can be stored and displayed on remote devices or other User Interfaces.

This allows optimization of the cube size because the temperature sensors effectively are measuring the level of the water in the tray. The user can select which water level the user prefers (a first level, second level, etc.) and the water can then be added based on the water level requested.

This is particularly helpful based on water pressure or water valve issues with a consumer's house since some houses will send out a lot of water (via a high water pressure) to the icetray and others will not have a good flow rate of water and thus, the ice tray will not be filled to the optimum level. By knowing the temperature of the tray which is directly proportional to the water fill level in the tray, the icetray can be filled to a desired level (and/or can be increased once the tray has already been initially filled).

Figure 13:
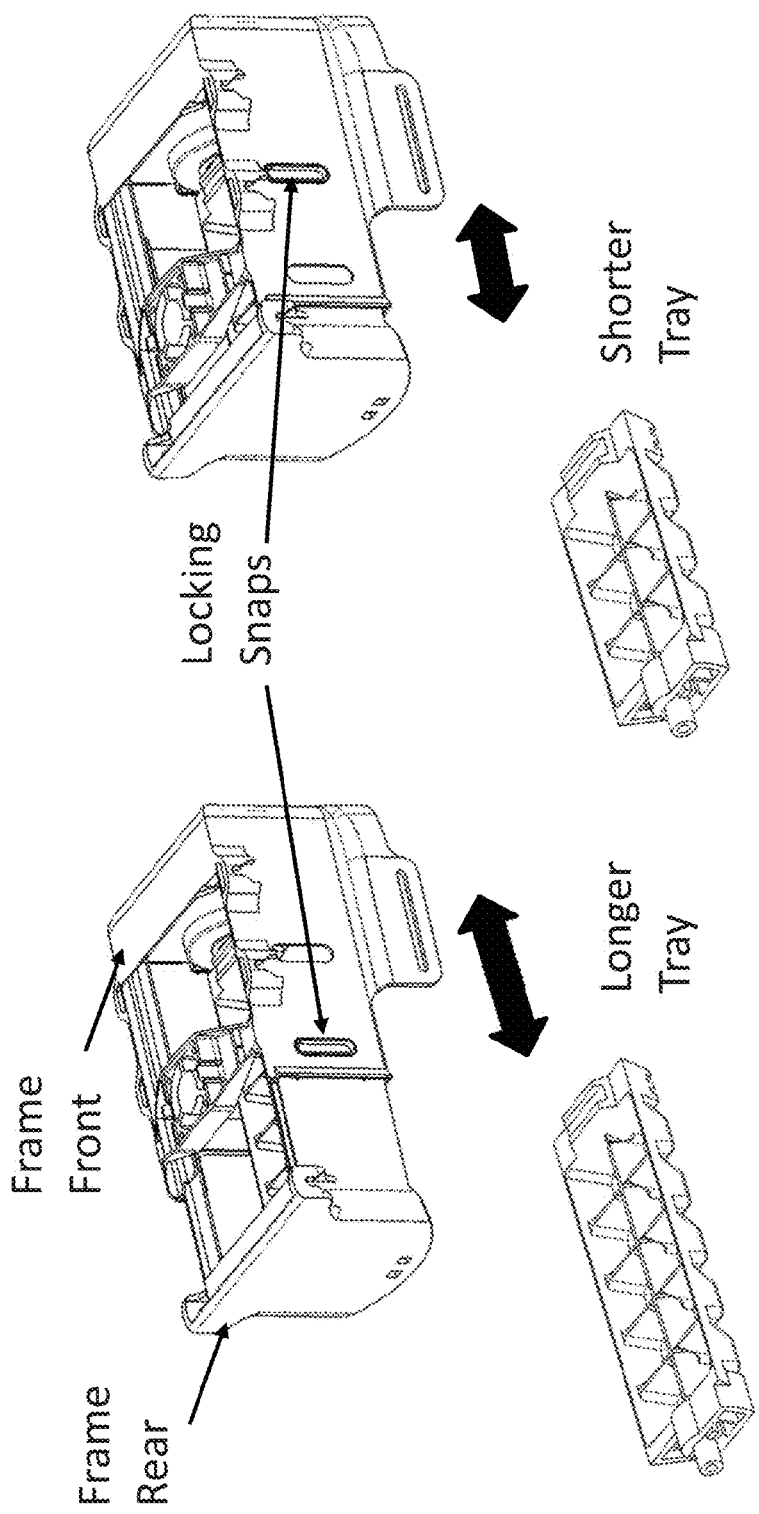
FIG. 13 illustrates variable tray sizes and an adjustable frame of the twist tray icemaker of FIG. 6, according to an embodiment.

FIG. 13 illustrates variable tray sizes and an adjustable frame of the twist tray icemaker of FIG. 6, according to an embodiment. A "telescoping" frame design allows for variation in the ice tray size, cube shape, and easy assembly or servicing of the ice tray and motor casing assembly. Due to the wide variety of refrigerator sizes and configurations and sizes, it is desirable to have a design that is flexible and can accommodate a wide variety of needs. E.g., it is possible to reuse the Motor Casing assembly and Frame Front and produce a new Frame Rear and Tray and effectively have a completely new and unique icemaker.

For example, as shown, the front frame has a frame that has a connector (e.g., a channel) that mates with a plurality of connectors (e.g., locking snaps) aligned along a longitudinal length of the rear frame. The front frame connector connects to each of the rear frame connectors to adjust the overall longitudinal length of the overall icemaker frame (the front and rear frames combined).

Figure 14:
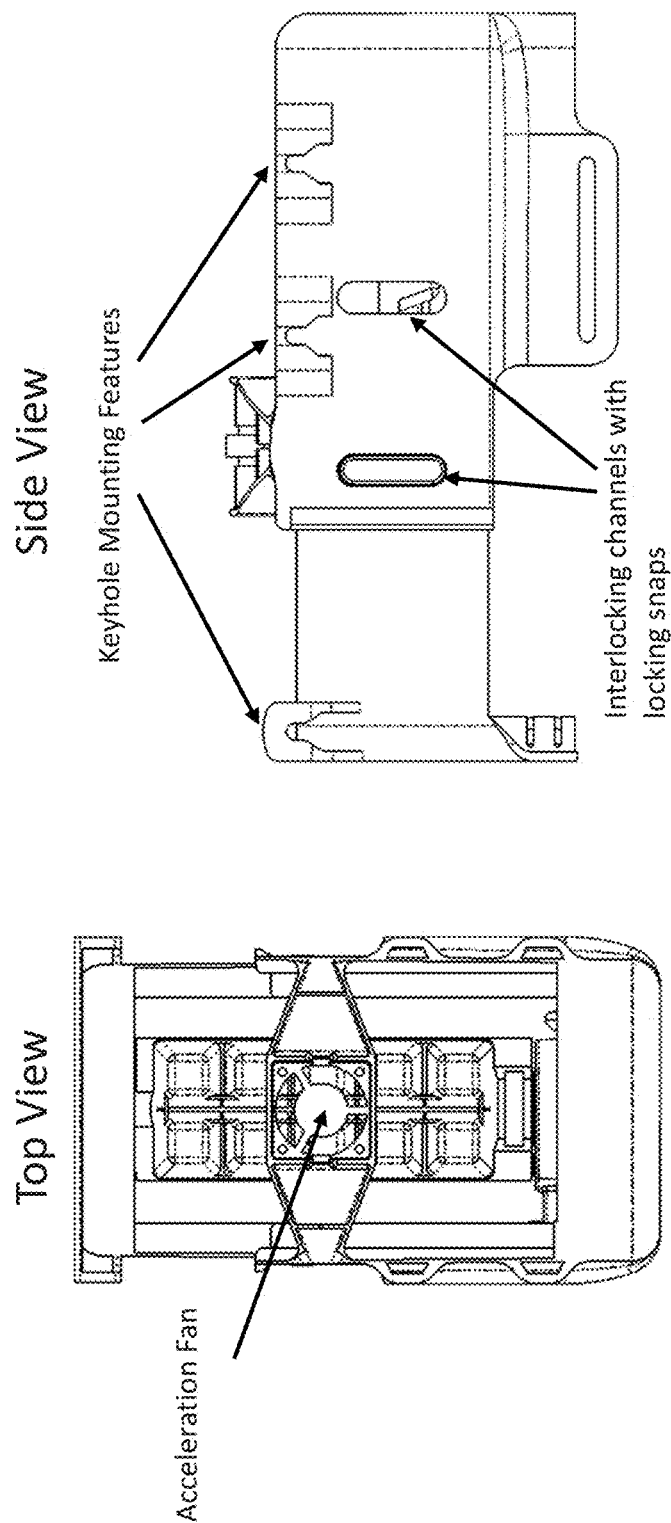
FIG. 14 illustrates top and side views illustrating an accelerating icemaking option in accordance with some embodiments.

FIG. 14 illustrates top and side views illustrating an accelerating icemaking option in accordance with some embodiments. Provided in FIG. 14 is an integrated fan option with accelerated icemaking algorithm. The fan is shown on top of the icemaker and is configured to directly blow air to the water in the icetray. It is noted that the fan may be connected to either the front frame or rear frame (shown in FIG. 3) and thus, can be movable along with one of the front frame or rear frame.

The addition of the fan does not require changing the compartment temperature as is current practice. Ice rates can be significantly improved by simply moving the cold air that exists in the freezer compartment at a very low CFM (approximately 5-10 CFM). This approach improves the ice production rate in a more energy efficient manner than running the entire cooling system and associated air stirring fans. (Traditionally, an accelerated icemaking algorithm requires the refrigerator to change the state of the freezer temperature for a brief period of time and or the state of an air circulation fan on the product.)

Figure 15:
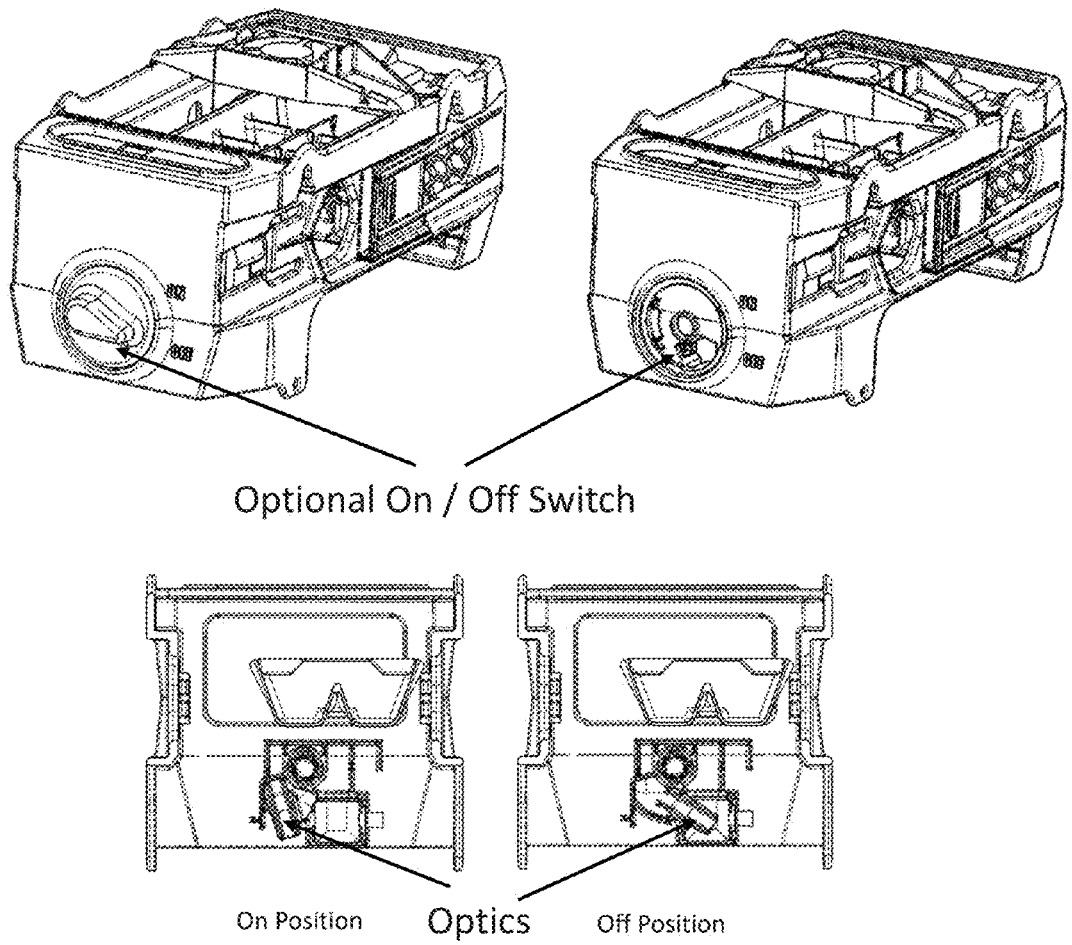
FIG. 15 illustrates an on/off switch of the twist tray icemaker of FIG. 6, according to an embodiment.

FIG. 15 illustrates an on/off switch directly on the twist tray icemaker of FIG. 6, according to an embodiment. The switch may be a non-electrical integrated "On/Off" switch (e.g., under R600a compatibility). It is common in some parts of the world to use a cooling refrigerant that is flammable. Refrigerators using this type of refrigerant are required to prevent any arcing or sparks inside of the refrigerator to prevent explosion in the event of a refrigerant leak inside of the product. As such, the icemaker under the embodiment of FIG. 15 can be turned "On/Off" by mechanically blocking the optics that work with the icemaking operations, thereby preventing any potential arcing or sparks. As shown in FIG. 15, the optics are blocked in when the switch is turned to the "off" position, and is not blocked (e.g., the optics are used for sensing in normal operations as discussed herein) when the switch is turned in the "on" position. This is explained in more detail in FIG. 16.

Figure 16:
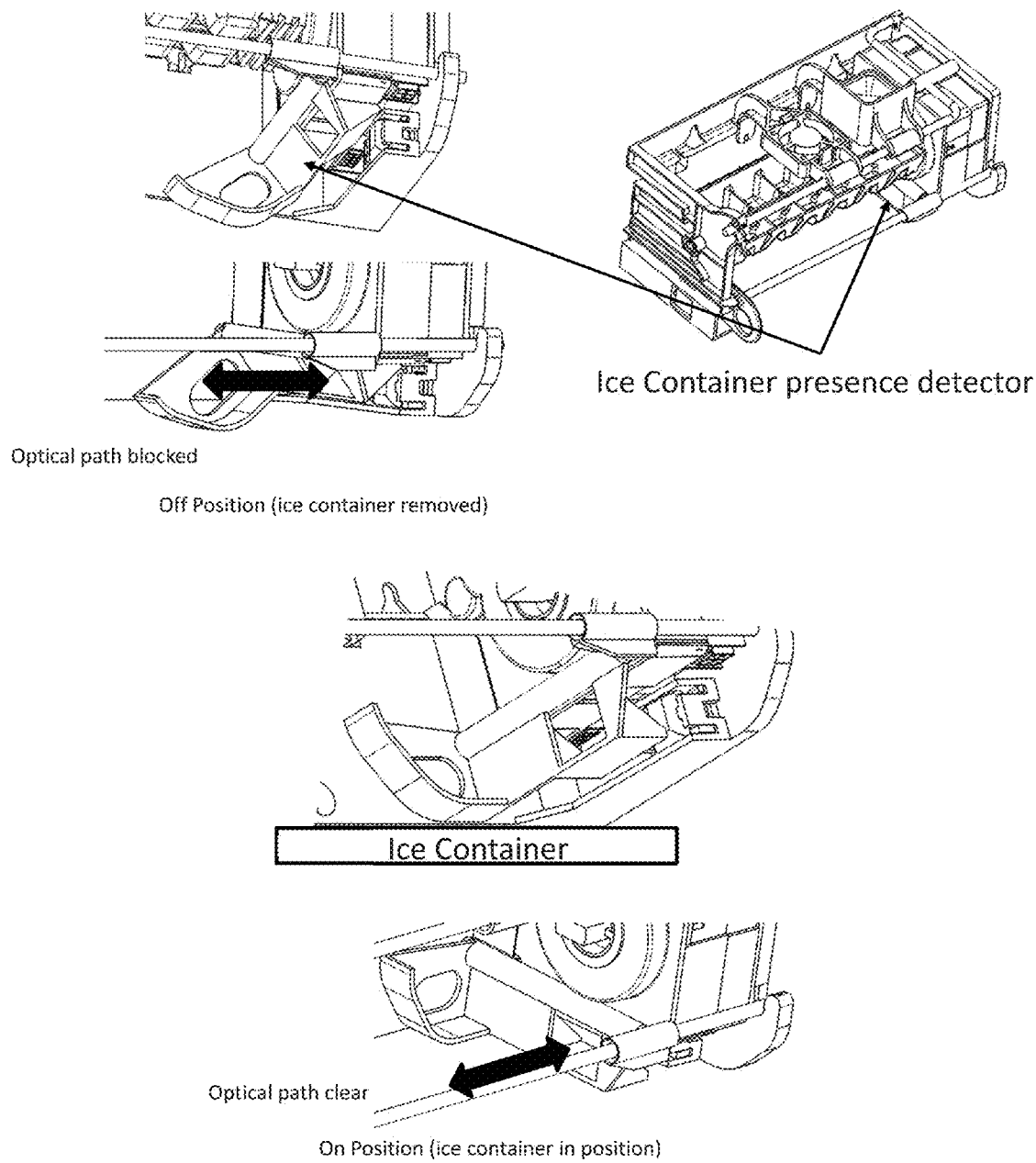
FIG. 16 illustrates an ice container presence detector of the twist tray icemaker of FIG. 6, according to an embodiment.

FIG. 16 illustrates an ice container presence detector of the twist tray icemaker of FIG. 6, according to an embodiment. Icemakers will continue to make ice if their ice level detection systems do not detect ice below the icemaker. Many times, consumers remove the ice container and do not replace it before the next batch of ice is ready to harvest. This condition allows the icemaker to dump ice into the freezer compartment and left unchecked, can fill the entire freezer compartment with ice. This undesirable condition can be prevented with a mechanical pivot device that allows the optical ice level detection system to operate as intended when the ice container is in position, and will block the optical path of the optics when the ice container is removed.

Figure 17:
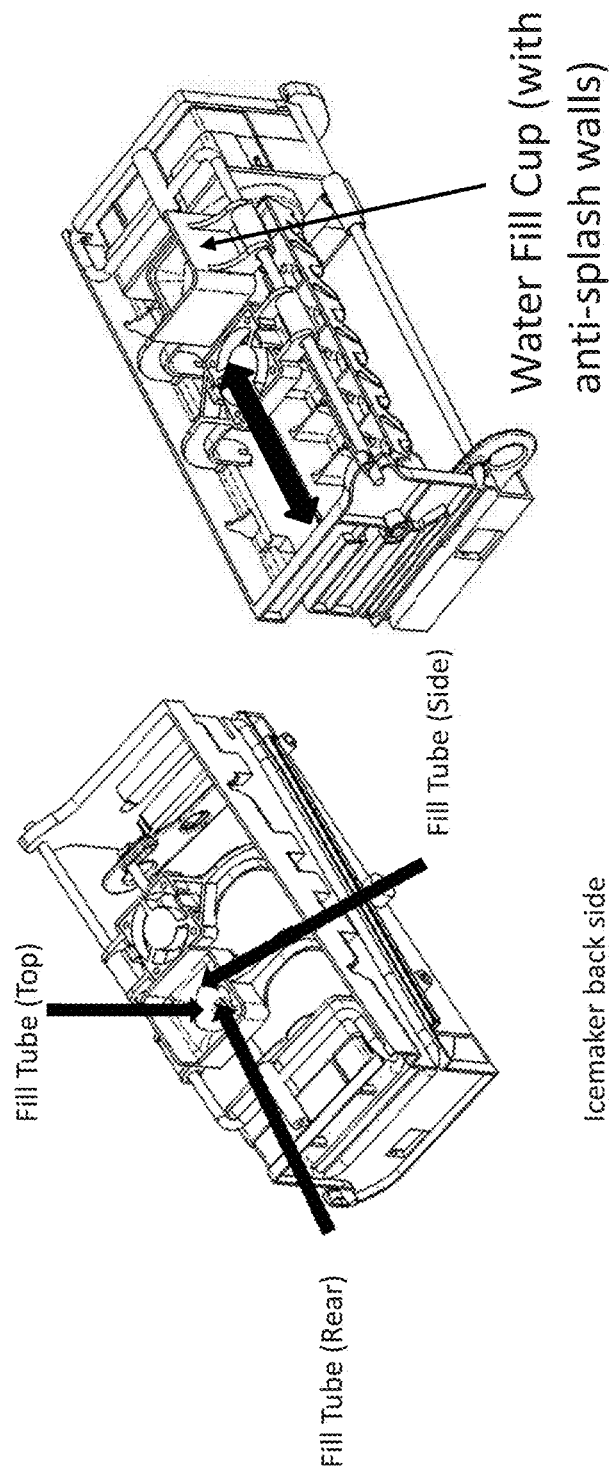
FIG. 17 illustrates a water fill cup of the twist tray icemaker of FIG. 6, according to an embodiment.

FIG. 17 illustrates a water fill cup of the twist tray icemaker of FIG. 6, according to an embodiment. The twist tray style icemaker is best filled directly above the tray (as opposed to the more traditional "die cast" tray style icemakers) which are most often filled from the end via a fixed position fill cup. Filling from a tube that is positioned above the tray can be problematic for the following reasons: 1. The fill tubes are situated in a wide variety of positions including both side, rear, and top walls of the freezer compartment. Additionally, the small angle off of the horizontal can make it difficult to hit the tray with the water especially due to water pressure variation. Having an adjustable position fill cup with two tall walls (to prevent splashing) can accommodate a wide variety of fill tubes by adjusting along the frame rails until the fill tube is positioned in the best mating position with the fill cup.

Figure 18:
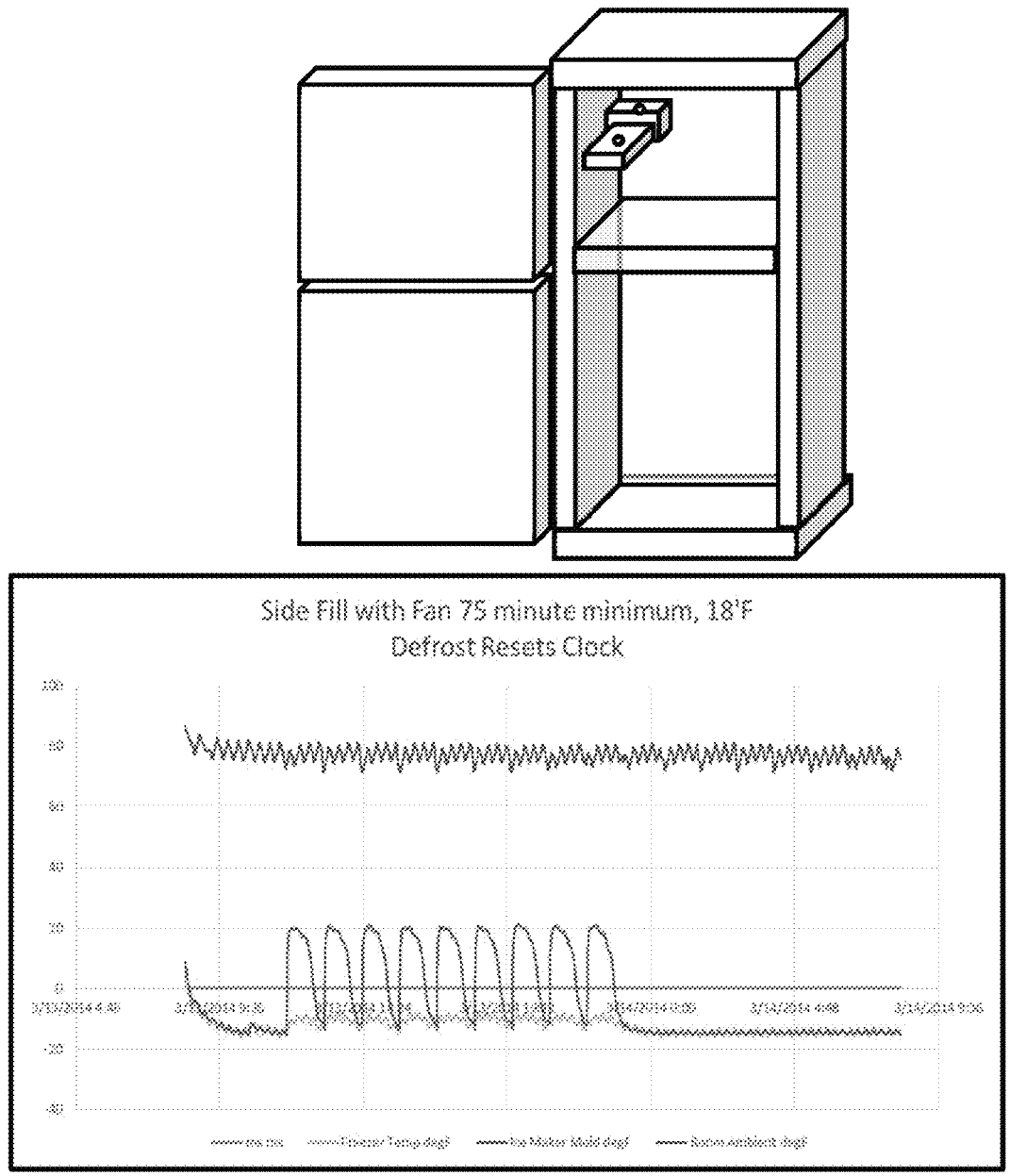
FIGS. 18 and 19 illustrate ice harvest detection and logic of the twist tray icemaker of FIG. 6, according to an embodiment.
Figure 19:
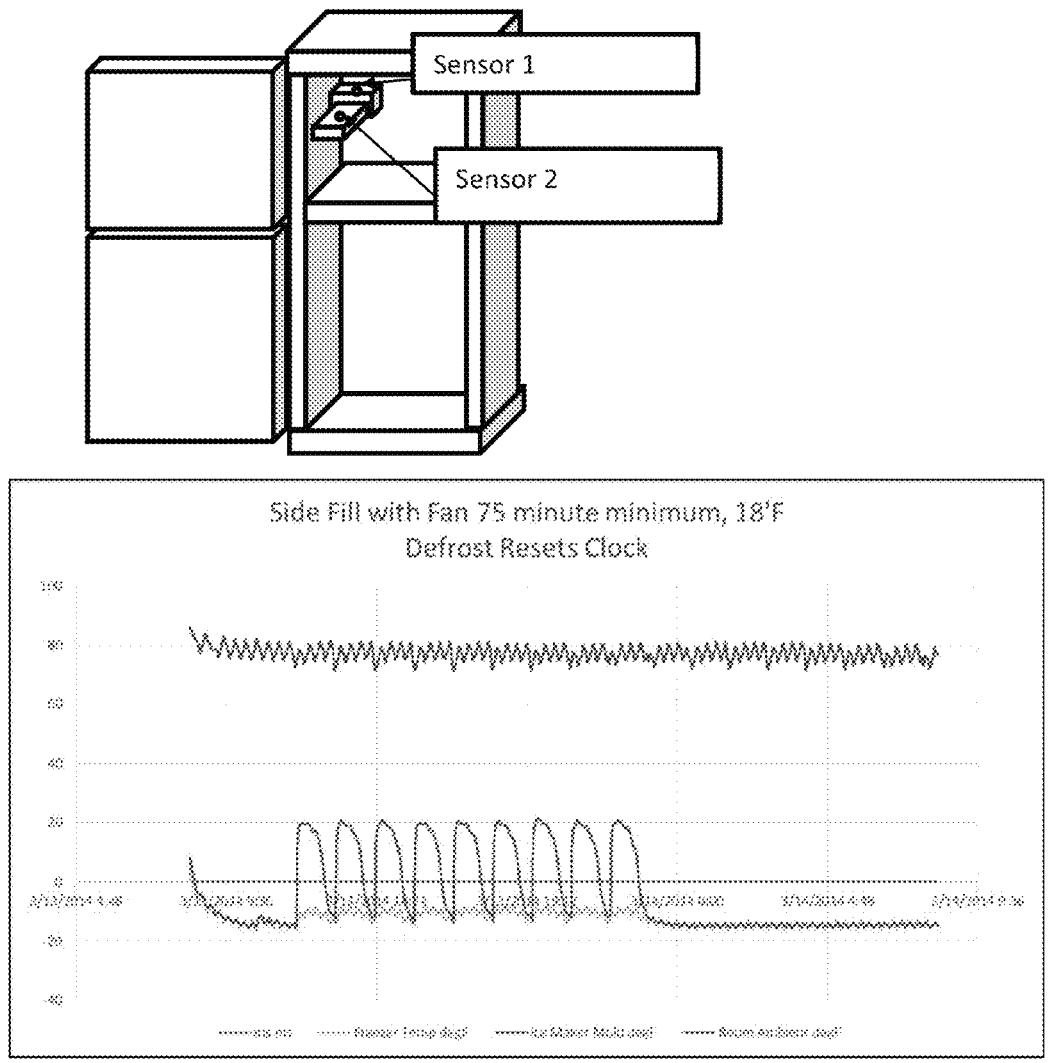
Figure 19:
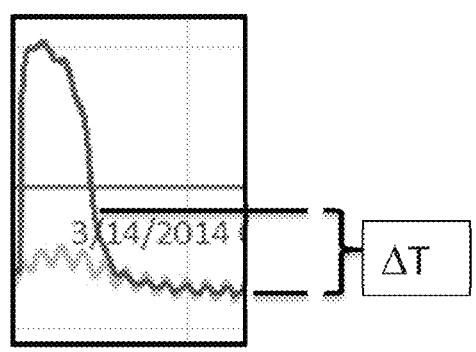

FIGS. 18 and 19 illustrate ice harvest detection and logic of the twist tray icemaker of FIG. 6, according to an embodiment. In FIG. 18, the system measures and compares the ambient temperate of the tray as compared with the steady stay of the cabinet. The compartment in the cabinet should stay at a steady state for a predefined amount of time in order to harvest ice. However, there is some flexibility in the steady state determination. For example, if the steady state of the cabinet is relatively proximate to the current ambient temperature of the compartment (such that the current ambient temperature is greater than the steady state) and it is approximately time to harvest, the system will harvest the ice. However, it is approximately time to harvest and if the current ambient temperature of the compartment is significantly different from the steady state of the cabinet, the system will not harvest the ice. For example, if the steady state temperature is 20 F and the system are almost ready to harvest but then the ambient temperature of the cabinet went up to 23 F, then the system will still harvest but if the steady state was at 0 F then the system will not harvest due to the significant difference between 0 F and 20 F.

FIG. 19 illustrates another system for ice harvest detection. In the embodiment of FIG. 19, there are two temperature sensors—a first temperature sensor and a second temperature sensor. The first temperature sensor measures the temperature of freezer compartment and the second temperature sensor measures the temperature of the ice mold.

The system also may include harvest logic. Harvest is accomplished by measuring the difference between the two temperature sensors. When the temperature difference is less than a critical threshold, the ice mold has adequately reached harvest conditions.

Fail-safe factors may also be satisfied to ensure system is working within acceptable parameters.

Another embodiment relates to a single sensor feedback having a temperature sensor as an input that measures the temperature of the ice mold, and harvest logic. In this embodiment, harvest is accomplished by first establishing the steady state temperature of the compartment. This is done by evaluation of temperature over time to determine steady state temperature. This value is stored. During ice production, the mold sensors each increase in temperature due to warm water entry of an initial fill of water to the tray. Harvest is initiated once the mold temperature is less than a critical threshold from the previously-recorded steady state temperature. Recalibration occurs periodically based on parameters such as time, full bucket conditions and/or product conditions. Fail-safe factors may also be satisfied to ensure system is working within acceptable parameters.

Figure 20:
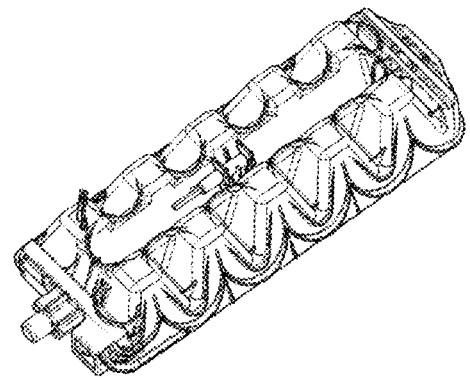
FIG. 20 illustrates the bottom portion of an ice tray and a graph illustrating a portion of the harvest recovery algorithm based on thermistor input during and after water fill cycles, according to an embodiment.
Figure 20:
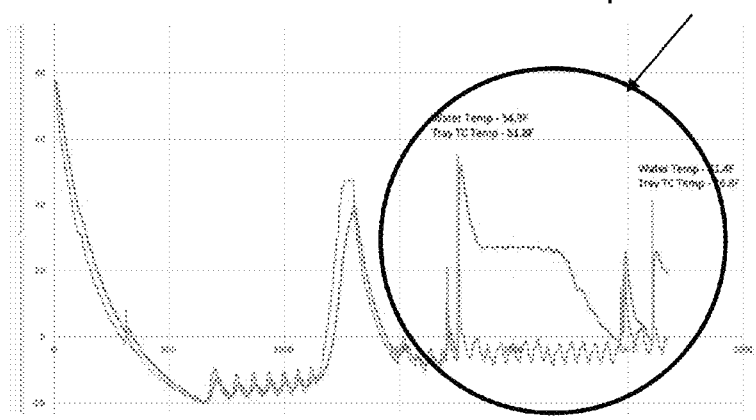

FIG. 20 illustrates the bottom portion of an ice tray and a graph illustrating a portion of the harvest recovery algorithm based on thermistor input during and after water fill cycles, according to an embodiment. When a tray harvests completely, the subsequent water fill will cause the temperature sensor on the tray to rise above a minimum level within a prescribed amount of time. If cubes fail to harvest the subsequent water fill will fail to increase the temperature of the tray to a minimum value within a prescribed time. This is a determination that the cubes were not harvested initially. Failure to harvest cubes will ultimately result in poor quality cubes and flooding of the ice bin. If harvest failure is detected, then the control circuit will run an "error harvest" which twists the tray to a more extreme angle and may be repeated multiple times to ensure ice harvest.

As shown in FIG. 20 is a graph shown in the highlighted area where the temperature of the tray goes up immediately, but then comes down immediately. This means that there is still cubes in that area of the tray since the temperature did not slowly go down (which would result if the water filled in the tray without any ice cubes since it would take a while for that water to cool down).

Figure 22A:
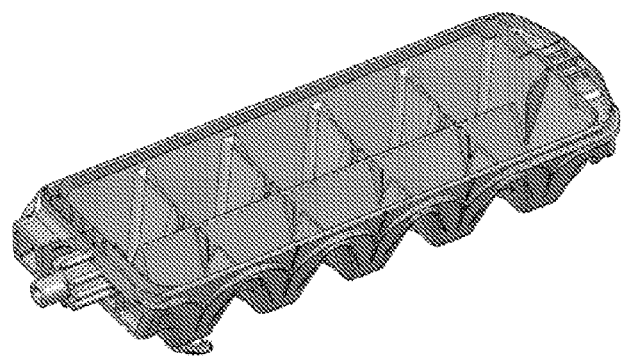
FIGS. 22A-22B illustrate icetrays with and without weirs in accordance with some embodiments.
Figure 22B:
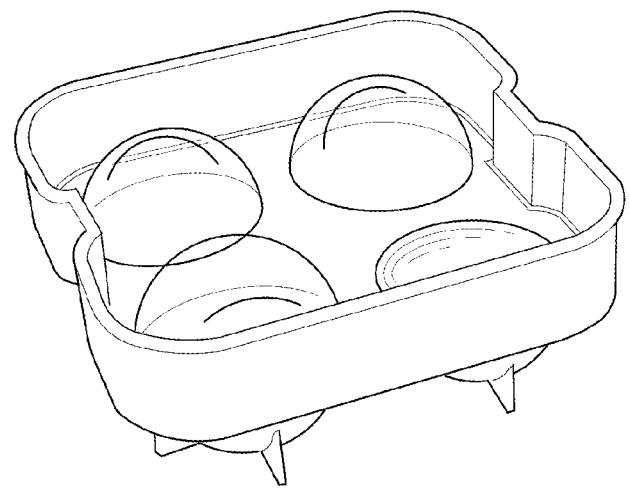

FIGS. 22A-B illustrates two versions of the icetrays. In FIG. 22A, the icetray may have weirs. Weirs may effectively be a low spot in the wall of the cube cavity that allows water to flow from one cube cavity to an adjacent one until all of the cube cavities contain an equal amount of water (provided the tray is level and there is an adequate amount of water added to the mold). This allows a relatively equal distribution of water in the tray.

The second embodiment is a weirless tray shown in the FIG. 22B. The tray has walls that do not have low spots. In other words, the walls of each cube cavity all extend so that water from one cavity is not communicable with water of another cavity while the tray is horizontal (and not moving). However, in one embodiment, the system described herein can accommodate a tray that is Wierless, and will accomplish filling all of the cavities by means of rocking the tray after water has been added to the mold until all of the water has a chance to settle equally into all of the cube cavities.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. An icemaker apparatus comprising:
   a gear having at least one slot, wherein the gear is connected to an icetray so that when the gear rotates, the icetray twists;
   an optical sensor that detects when the gear has rotated the slot over the optical sensor; and
   a control circuit that:
      twists the icetray while the gear is rotated in a first direction away from a home position to a reverse twist position;
      reverses the rotation of gear to twist the icetray to a harvest position in a second direction that is opposite of the first direction until ice in the icetray is dislodged.

2. The icemaker apparatus of claim 1, wherein harvest position and reverse twist position are located on opposite sides of the home position.

3. The icemaker apparatus of claim 2, wherein the home position is a position where the ice tray is horizontal and at a position where the icetray is initially filled with water.

4. The icemaker apparatus of claim 1, wherein the tray comprises a protrusion which makes contact with a point on a frame of an icemaker so that the tray then twists when the gear moves the icetray in the first or second direction when the protrusion makes contact with the frame.

5. The icemaker apparatus of claim 1, wherein the optical sensor detects that the icetray has moved to the reverse twist position by the optical sensor no longer receiving light indicating that the optical sensor is no longer in the slot.

6. The icemaker apparatus of claim 1, wherein the optical sensor detects that the icetray has moved to the reverse twist position by the optical sensor receives light indicating that the optical sensor is in the slot.

7. The icemaker apparatus of claim 1, wherein the optical sensor detects that the icetray has moved to the harvest position by the optical sensor detecting moving past the home position and then receiving light at a second slot.

8. A method for harvesting ice from an icetray of an icemaker, comprising:
   providing:
      a gear having at least one slot, wherein the gear is connected to an icetray so that when the gear rotates, the icetray twists; and
      an optical sensor that detects when the gear has rotated the slot over the optical sensor;
   twisting the icetray while the gear is rotated in a first direction away from a home position to a reverse twist position; and
   reversing the rotation of gear twists the icetray to a harvest position in a second direction that is opposite of the first direction until ice in the icetray is dislodged.

9. The method of claim 8, wherein harvest position and reverse twist position are located on opposite sides of the home position.

10. The method of claim 9, wherein the home position is a position where the ice tray is horizontal and at a position where the icetray is initially filled with water.

11. The method of claim 8, wherein the home position is a position where the ice tray is horizontal and at a position where the icetray is initially filled with water.

12. The method of claim 8, further comprising detecting that the icetray has moved to the reverse twist position by the optical sensor no longer receiving light indicating that the optical sensor is no longer in the slot.

13. The method of claim 8, further comprising detecting that the icetray has moved to the reverse twist position by the optical sensor receives light indicating that the optical sensor is in the slot.

14. The method of claim 8, further comprising detecting that the icetray has moved to the harvest position by the optical sensor detecting moving past the home position and then receiving light at a second slot.

15. An icemaker system comprising:
   a gear having at least one opening, wherein the gear is connected to an icetray and a motor so that when the motor rotates the gear, the icetray twists; and
   an optical sensor that detects when the gear has rotated the opening over the optical sensor,
   wherein the icetray twists while the gear is rotated in a first direction away from a home position to a reverse twist position based on a position of the at least one opening relative to the optical sensor, and
   wherein the rotation of the gear reverses to twist the icetray to a harvest position in a second direction that is opposite of the first direction to dislodge the ice in the icetray.

16. The system of claim 15, wherein the at least one opening comprises a first opening to determine when the icetray is in the home position and a second opening to determine when the icetray is in the harvest position.

* * * * *